United States Patent
Smith et al.

(10) Patent No.: US 6,289,764 B1
(45) Date of Patent: Sep. 18, 2001

(54) METHOD OF MANUFACTURING A CAMSHAFT

(75) Inventors: Damian P. Smith, Egnach (CH); Gary S. Antcliff, Columbus, IN (US)

(73) Assignees: Cummins Engine Company Ltd., Darlington; Iveco (UK) Ltd., Watford; New Holland U.K. Ltd., Basildon, all of (GB)

( * ) Notice: Subject to any disclaimer, the term of this patent is extended or adjusted under 35 U.S.C. 154(b) by 0 days.

(21) Appl. No.: 09/343,020

(22) Filed: Jun. 29, 1999

(30) Foreign Application Priority Data

Jun. 30, 1998 (GB) .................................................. 9814079

(51) Int. Cl.$^7$ .............................. F16H 53/00; F01L 1/047
(52) U.S. Cl. ...................... 74/567; 29/527.6; 29/888.1; 123/90.6
(58) Field of Search .............................. 74/567; 29/888.1, 29/527.6; 123/90.6

(56) References Cited

U.S. PATENT DOCUMENTS

| | | |
|---|---|---|
| 1,705,187 | 3/1929 | Keeports . |
| 1,861,272 | 5/1932 | Hildorf . |
| 3,064,946 | 11/1962 | Fritz . |
| 3,272,189 * | 9/1966 | Turkish ................................ 123/90.6 |
| 4,033,016 | 7/1977 | Mayer . |
| 4,356,741 | 11/1982 | Schöpf . |
| 4,829,951 * | 5/1989 | Hafele ................................. 123/90.6 |
| 4,838,217 * | 6/1989 | Ruf et al. ............................. 123/90.6 |
| 5,009,001 | 4/1991 | Deschler . |
| 5,109,726 * | 5/1992 | Ohlendorf et al. ..................... 74/567 |
| 5,286,069 | 2/1994 | Wilson . |
| 5,497,679 * | 3/1996 | Mitchell et al. ....................... 74/567 |
| 5,520,144 * | 5/1996 | Phil et al. ........................... 74/567 X |
| 6,035,821 * | 3/2000 | Takahashi et al. ................. 74/567 X |

FOREIGN PATENT DOCUMENTS

| | | |
|---|---|---|
| 1220746 | 5/1960 | (FR) . |
| 2270272A | 3/1994 | (GB) . |
| 2271070A | 4/1994 | (GB) . |
| 63-68325 | 3/1988 | (JP) . |

* cited by examiner

Primary Examiner—Richard M. Lorence
(74) Attorney, Agent, or Firm—Gary M. Gron

(57) ABSTRACT

A method of manufacturing a camshaft comprises the first step of casting a blank defining a central shaft, concentric journal bearings and eccentric cam lobes, the cam nose region between the journal bearing at the driven end of the camshaft and the adjacent cam lobe being cast in the same non-circular shape as the cam lobe but with smaller dimensions. The cam nose and the cam surface of the first cam lobe are then ground.

Preferably, the cam lobe surface and the cam nose are ground at the same time as one another by means of a shaped grinding wheel having a cylindrical portion for grinding the cam surface and a narrower contoured portion of larger diameter at one end for grinding the cam nose.

9 Claims, 2 Drawing Sheets

METHOD OF MANUFACTURING A CAMSHAFT

FIELD OF THE INVENTION

The present invention relates to a method of manufacturing an engine camshaft.

BACKGROUND OF THE INVENTION

Known engine camshafts comprise a shaft, cam lobes for valve actuation and journal bearings all formed in a single casting. After casting a blank having the approximate desired dimensions, the bearings and cam lobe surfaces are machined and/or ground to the precise required dimensions.

In an engine where the camshaft is mounted overhead, that is over the valve mechanism, the journal bearings can have a diameter smaller than the cam lobes because it is possible to assemble pillow blocks about the journal bearings. On the other hand, in a push rod engine where the camshaft is mounted in the side of the engine block and actuates the valve mechanism through cam lobe followers and pushrods, the journal bearings must have a diameter at least as large as the cam lobes to allow the camshaft to be inserted from one end into a longitudinal camshaft bore in the engine block.

The weak point in either type of camshaft lies between the journal bearing at the driven end of the camshaft and the adjacent cam lobe as a result of the torsional bending forces exerted by the drive arrangement on the camshaft. This is because some engines have an arrangement where one or more power consuming accessories are driven through the camshaft drive gear which meshes with a crankshaft drive gear. These accessories, which can consume up to 100 hp., are driven from the camshaft drive gear. The reaction forces between the accessory gear and the camshaft drive gear impose a significant bending load on the camshaft. This bending load is resisted by the camshaft bearing nearest the drive gear but is passed to the camshaft between this bearing and the first cam lobe.

Conventionally, the nose of this first cam lobe (i.e. its axial end) is formed by first casting the region of the camshaft between the cam lobe and the journal bearing to be of circular cross section having a diameter just under the diameter of the baseline circle for the cam lobe. For increased strength, however, this cam nose region is then machined down to a slightly smaller and smooth circular cross section. The reason for this last step is that a cast region is more prone to cracking and even though the machining reduces its cross sectional area it increases its strength.

Such a method of manufacture results in a cam nose of moderate strength and to achieve the desired durability it has been necessary to use material of a high strength, such as steel, thereby adding considerably to the cost of the camshaft.

SUMMARY OF THE INVENTION

According to a first aspect of the present invention, there is provided a method of manufacturing a camshaft which comprises casting a blank comprising a central shaft, concentric journal bearings and eccentric cam lobes, the cam nose region between the journal bearing at the driven end of the camshaft and the adjacent cam lobe being cast in the same shape as the cam but with smaller dimensions, and grinding the cam nose and the cam surface of the first cam lobe.

According to a second aspect of the invention, there is provided a camshaft shaft comprising a central shaft, having concentric journal bearings and eccentric cams, wherein the cam nose region between the journal bearing at the driven end of the camshaft and the adjacent cam is cast in the same shape as the cam but with smaller dimensions, and is finished by grinding.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
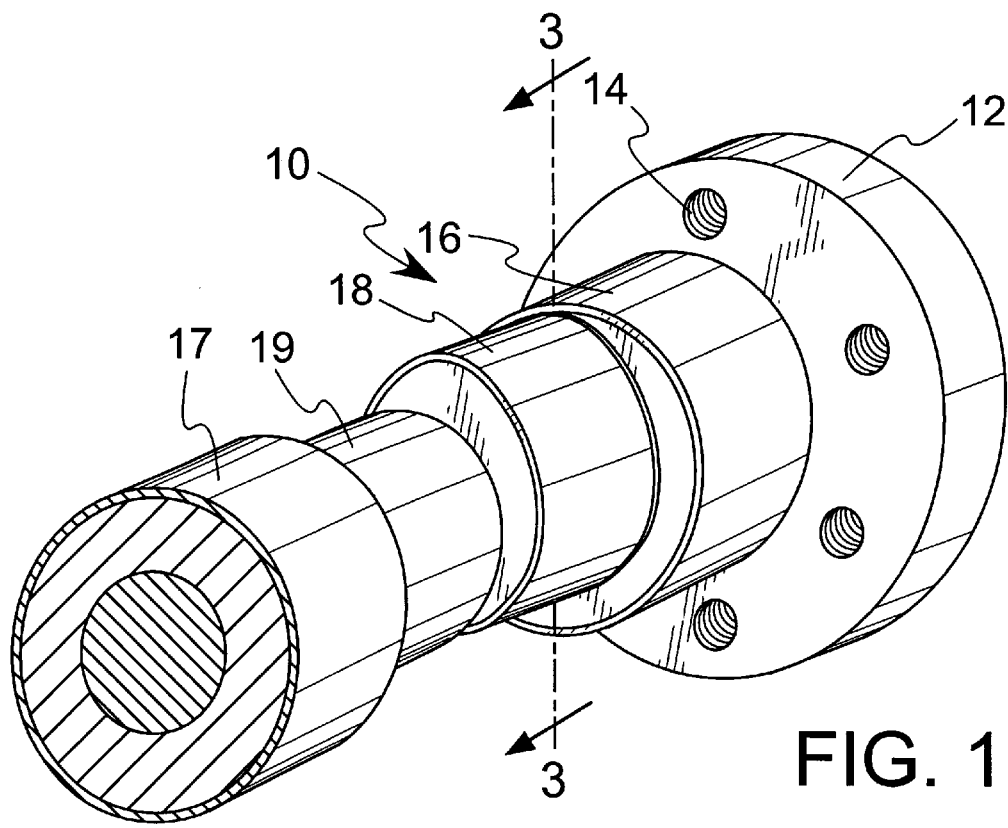
FIG. 1 is a perspective view of a camshaft embodying the present invention.

FIG. 1 is a perspective partial view of a camshaft 10, for use in an engine (not shown), showing only the section adjacent the driven end of the camshaft. It should be apparent to those skilled in the art that additional cam lobes and journals may be employed beyond the two shown as needed for the number of cylinders. The usual function of a camshaft is to actuate the intake and exhaust valves at the appropriate time in the engine operating cycle. For a four stroke engine the camshaft is driven at half the rpm of the engine crankshaft. Engines that operate using the compression ignition or diesel cycle employ a heavy duty driving connection between the engine crankshaft and camshaft. The camshaft 10 has a drive flange 12 with threaded holes 14 to allow a drive sprocket (not shown) to be bolted to the camshaft. As described above, the drive sprocket meshes with a crankshaft gear and also drives additional accessories, thus creating bending loads. FIG. 1 also shows the first and second journal bearings 16, 17 and the first and second cam lobes 18, 19 that normally drive an exhaust valve and intake valve, respectively.

The camshaft 10 is formed by first casting a unitary blank having the same shape as the finished camshaft but with slightly larger dimensions to allow the surfaces of the cam lobes, the journal bearings and the cam noses to be ground or machined to their exact required sizes. As mentioned above, the material of prior art camshafts is steel for heavy duty operation. In accordance with the present invention, the camshaft may be formed out of ductle iron resulting in a significant savings in material costs. In the nose region 15 between the journal bearing 16 and the first cam lobe 18, the blank is formed of the same shape as the cam lobe, i.e. non-circular but slightly smaller. To avoid the problem of prior art camshaft configuration, the camshaft in the drawings is formed by grinding the nose of the cam to the profile partly shown in FIG. 2 at the same time as the surface of the cam lobe is ground, using a suitably shaped grinding wheel. FIG. 3 shows a cross-sectional view taken in a direction away from the drive flange 12. The exhaust lobe 18 and intake lobe 19 are shown out of phase with one another due to their sequential operation of their respective valves. The "as cast" shape of the exhaust valve nose region 15 generally follows the shape of the exhaust lobe 18, i.e. it is non circular relative to prior art nose configurations illustrated by dashed line A.

Figure 2:
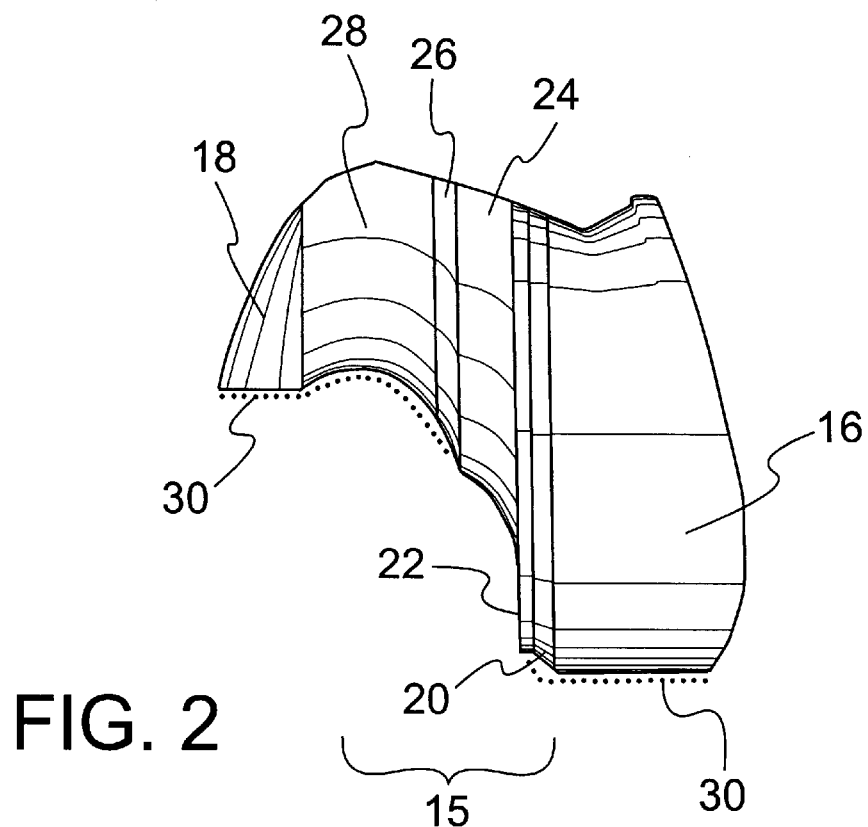
FIG. 2 is a detail showing the nose of the first cam.
Figure 3:
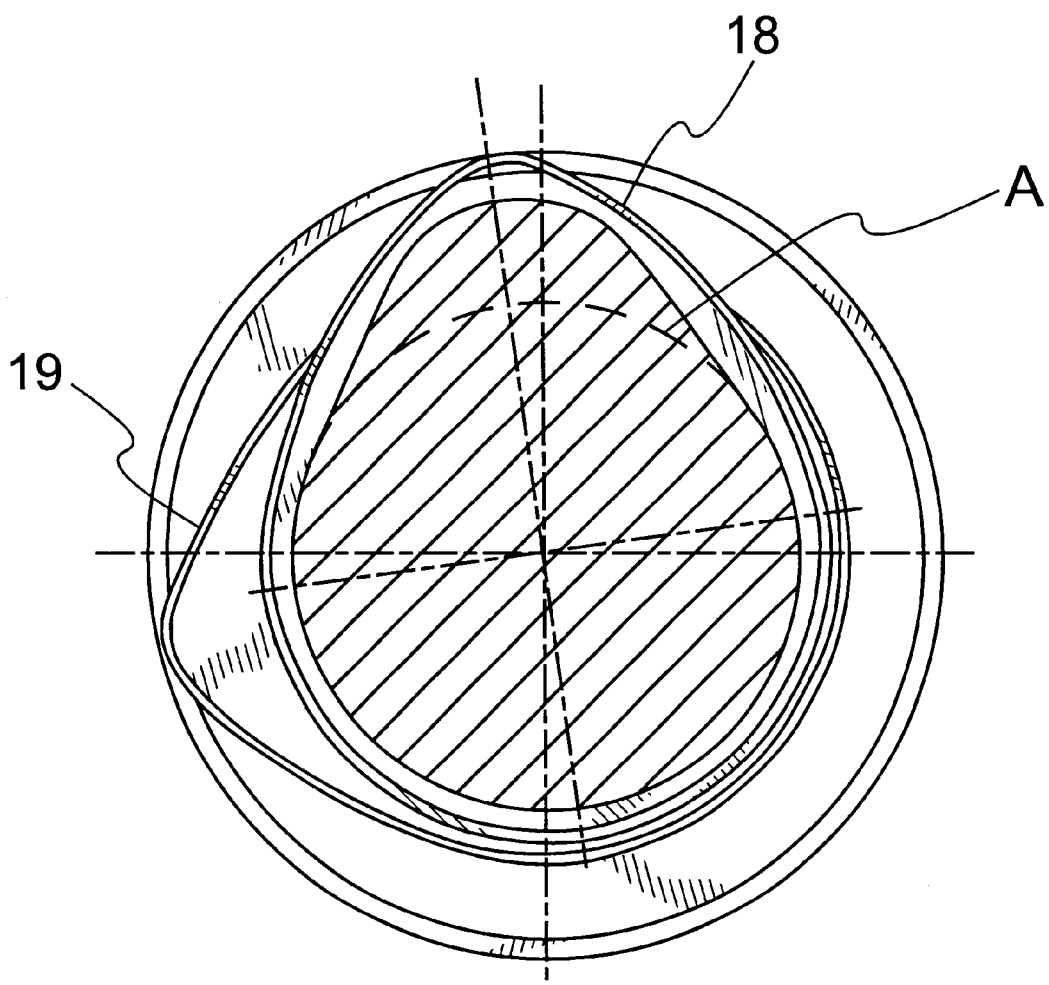
FIG. 3 is a cross-sectional view taken on lines 3—3 of FIG. 1.

FIG. 2 is a partial section of the region of the camshaft between the first cam 18 and the journal bearing 16. The outline of the blank prior to its surface being finished, is represented by the dotted lines 30. The journal bearing 16 is turned to the desired diameter and its end is formed with a small step defined by a conical region 20 and a cylindrical region 22 both of which are turned.

The region 24 immediately following the small step is left as cast and is neither machined nor ground. The cam lobe 18 and its contoured nose region consisting of two sections 28 and 26 are all ground at the same time and therefore all have the same cross-sectional shape. The grinding is effected using a grinding wheel that comprises a cylindrical portion of the width of the cam lobe 18 for grinding the surface of the cam lobe 18 and a ring of larger diameter at the end of the cylindrical portion for grinding the sections 28 and 26. The section 28 has a small radius and the section 26 has a larger radius, the two sections meeting tangentially to achieve a gradual transition, so that the two sections 28 and 26 together approximate an exponential curve. The section 26 abuts the region 24 of the camshaft that is left as cast and terminates before it is normal to the camshaft axis. As a result, the side of the grinding wheel is not eroded during the grinding process thereby prolonging the life of the grinding wheel by allowing it to be dressed when necessary.

In accordance with the present invention, the cam nose between the first cam lobe and the journal bearing at the driven end of the camshaft is ground so that it retains its relatively large cam like non-circular cross section but its surface is ground smooth for strength. In this way, there is sufficient metal to impart strength and durability to the camshaft without the need to resort to more expensive high quality steel.

It is preferred to grind the cam nose and the cam surface of the first cam lobe simultaneously with one another by means of a shaped grinding wheel having a cylindrical portion for grinding the cam surface and a narrower contoured portion of larger diameter at one end for grinding the cam nose. This helps in keeping manufacturing cost low, as it avoids the need for a separate machining step.

The design on the cam nose surface is important and should ideally resemble an exponential curve of constantly changing radius. In a preferred embodiment of the invention, an approximation to such a curve is achieved by forming the contoured portion of the grinding wheel in two sections, the section adjacent the cam surface having a relatively small radius of curvature and the second having a larger radius of curvature, the curves having a common tangent where they meet.

It would be possible to grind the entire nose region between the cam and the journal bearing but this would create wear on the axial end of the grinding wheel making it difficult to dress. It is therefore preferred to stop the section of the grinding wheel with the larger diameter before it becomes perpendicular to the shaft axis and to leave the part of the nose region adjacent the journal bearing as cast. This part of the nose region because of its size and its proximity to the journal bearing is not prone to failure even when left as cast.

While only the nose of the first cam presents a source of weakness, it is possible to form the noses of all the cams in this manner. Furthermore, by suitable design of the camshaft and the grinding wheel, it is possible to use the same wheel to grind all the cams and cam noses without grinding a radius on any other lobe than the one required. This is achieved by designing the casting with clearance to the remaining lobes to avoid grinding parts which should not be touched.

Though the invention has been described by reference to the manufacture of the nose of the first cam lobe, the same method can of course be used to form the noses between all the cam lobes and the adjacent journal bearings.

Having thus described the invention, what is claimed as novel and desired to be secured by Letters Patent of the United States is:

1. A method of manufacturing a camshaft comprising the steps of: casting a blank comprising a central shaft having a driven end, concentric journal bearings and eccentric cam lobes having a non-circular shape, and a cam nose region between a journal bearing at the driven end of the camshaft and an immediately adjacent first cam lobe, said cam nose region being cast in the same shape as the adjacent cam lobe but with smaller dimensions, and grinding the cam nose and the cam surface of the first cam lobe with substantially the same contour.

2. A method as claimed in claim 1, wherein the cam nose and the cam surface of the first cam lobe are ground simultaneously with one another by means of a shaped grinding wheel having a cylindrical portion for grinding the cam surface and a narrower contoured portion of larger diameter at one end for grinding the cam nose.

3. A method as claimed in claim 2, wherein the contoured portion of the grinding wheel is formed in two sections, the section adjacent the cam surface having a relatively small radius of curvature and the second having a larger radius of curvature, the curves having a common tangent where they meet.

4. A method as claimed in claim 3, wherein the section of the grinding wheel with the larger diameter terminates before it is perpendicular to the shaft axis so as to leave the part of the nose region adjacent the journal bearing as cast.

5. A method as claimed in claim 1, wherein said camshaft has a plurality of cam lobes and immediately adjacent concentric journal bearings and wherein the noses of all the cams are formed in the same manner as the nose between the cam and the immediately adjacent journal bearing at the driven end of the camshaft.

6. A method as claimed in claim 5, wherein the same grinding wheel is used sequentially to grind all the cams and cam noses, the camshaft and the grinding wheel being designed such that each cam nose can be ground without grinding a radius on any lobe other than the one required.

7. A camshaft comprising a central shaft having a driven end and having concentric journal bearings and eccentric non-circular cam lobes, said camshaft having a cam nose region between the journal bearing at the driven end of the camshaft and an immediately adjacent cam lobe, said cam nose region having the same shape as the cam but with smaller dimensions, and said cam lobe and adjacent nose region have a ground surface.

8. A camshaft as claimed in claim 7, wherein only the region of the adjacent the cam is ground, the region adjacent the journal bearing an as cast surface.

9. A camshaft as claimed in claim 8 wherein, the ground region adjacent the cam is formed in two sections, the section adjacent the cam surface having a relatively small radius of curvature and the second having a larger radius of curvature, the curves having a common tangent where they meet.

* * * * *